United States Patent
Pryor et al.

(10) Patent No.: US 8,339,404 B2
(45) Date of Patent: Dec. 25, 2012

(54) SYSTEM FOR IMPROVING UTILIZATION OF GPU RESOURCES

(75) Inventors: Gallagher Pryor, Atlanta, GA (US); James G. Malcolm, Marietta, GA (US); John Melonakos, Austell, GA (US); Tauseef ur Rehman, Atlanta, GA (US)

(73) Assignee: Accelereyes, LLC, Austell, GA (US)

( * ) Notice: Subject to any disclaimer, the term of this patent is extended or adjusted under 35 U.S.C. 154(b) by 1034 days.

(21) Appl. No.: 12/323,572

(22) Filed: Nov. 26, 2008

(65) Prior Publication Data

US 2009/0141034 A1    Jun. 4, 2009

Related U.S. Application Data

(60) Provisional application No. 60/991,105, filed on Nov. 29, 2007.

(51) Int. Cl.
G06F 15/16 (2006.01)
G06F 15/80 (2006.01)
G06F 1/00 (2006.01)

(52) U.S. Cl. ........ 345/522; 501/502; 501/503; 501/504; 501/505

(58) Field of Classification Search .......... 345/501–505, 345/522
See application file for complete search history.

(56) References Cited

U.S. PATENT DOCUMENTS

2006/0098019 A1* 5/2006 Tarditi et al. .................. 345/505

* cited by examiner

*Primary Examiner* — Hau Nguyen
(74) *Attorney, Agent, or Firm* — Bryan W. Bockhop; Bockhop & Associates, LLC (57) ABSTRACT

A method, executable on a digital computer that includes a central processing unit (CPU) and a graphics processing unit (GPU), executes a series of instructions, in which a GPU data type is defined and at least one data unit is designated with the GPU data type. A series of instructions is executed on the central processing unit. The method determines that a first unit of instruction code, included in the series of instructions, will be scheduled to operate on a GPU data type-designated data unit within a predetermined number of cycles. The GPU data type-designated data unit is caused to be operated on by a second unit of instruction code, that functionally corresponds to the first unit of instruction code. The second unit of instruction code is executed on the graphics processing unit.

16 Claims, 6 Drawing Sheets

FIG. 7

SYSTEM FOR IMPROVING UTILIZATION OF GPU RESOURCES

CROSS-REFERENCE TO RELATED APPLICATION(S)

This application claims the benefit of U.S. Provisional Patent Application Ser. No. 60/991,105, filed Nov. 29, 2007, the entirety of which is hereby incorporated herein by reference.

BACKGROUND OF THE INVENTION

1. Field of the Invention

The present invention relates to computer processing systems and, more specifically, to a processing system that directs central processing unit instructions to be executed on a graphics processing unit.

2. Description of the Prior Art

The majority of current software programs are designed to utilize the processing power of the central processing unit (CPU). Traditionally, most CPUs operated in a sequential fashion, meaning they executed one instruction on one or two pieces of data at a time. While technical innovations in the CPU field have allowed for computations to be performed more quickly, the sequential nature of CPUs has resulted in a significant degree of inefficiency. Because the CPU can only perform one instruction at a time, the CPU must wait for a first instruction to complete before beginning to execute a second instruction. This creates a bottleneck which results in slower computational times. Recent developments in CPU technology have addressed this limitation by increasing clock speed. While this does speed up computation time, increasing the clock speed does not address the root problem of the inherent sequential nature of CPUs.

More recently, CPU designers have recognized this serial limitation and have begun to implement improvements to execute instructions in parallel rather than in series. A simple method to accomplish parallel computation is called instruction level parallelism. Instruction level parallelism allows for more than one instruction to be performed at a time by segmenting the execution pathway into multiple stages. Another approach taken towards increasing the parallel computing power of the CPU is thread level parallelism. Thread level parallelism involves the use of multiple CPUs to obtain faster results. While both of these approaches address the problems of serial computations on a CPU, they are both disfavored as they do not solve the underlying hardware limitations of CPUs.

In addition to a CPU, more and more personal computers now contain a graphics processing unit (GPU). GPUs were originally developed by companies such as 3DFX and SGI, and later purchased by NVIDIA® and ATI® to support the growing video game market. Computer graphic computations, particularly those of video games, are highly parallel and demand very high computational speeds. As a result of this demand, processor manufacturers developed GPUs which were optimized for high throughput. This was a departure from CPUs which are optimized for low latency.

The GPU can execute many parallel computations because of its architecture. The architecture of the GPU, which allowed it to be used in graphics intensive applications, has also allowed it to be adapted for use as a general computational engine, similar to a CPU. The parallel nature of GPUs means that programs, which are parallelizable, can be performed by the GPU at significantly higher speeds than CPUs. GPUs can produce speedups of five to more than one hundred times that of a CPU, provided that the software is well suited to the parallel computation of the GPU.

Currently many programs perform the majority of their calculations on a CPU even though such calculations could be performed more quickly on a GPU. One such program is MATLAB®, a product of The Mathworks, Inc. MATLAB® is a premium numerical computing environment and programming language. MATLAB® is known for allowing users to easily manipulate matrices or arrays, and to create complex algorithms and user interfaces. MATLAB® is very popular among engineers and scientists, particularly those involved in linear algebra, numerical analysis and image processing.

MATLAB® is unique among many programming languages because it is an interpreted language rather than a compiled language. Interpreted languages use an interpreter to translate higher level programming languages into an intermediate form which is then executed. Many other higher level languages, including C++, use a compiler to translate source code to object code and the object code is then passed to a linker which ultimately produces machine code. A practical difference between compiled and interpreted languages is compiled languages are generally more difficult to program because the complete code must be written before any testing can be performed. Interpreted languages however, can be tested line by line as the interpreter can execute the code without a complete program.

The core environment of MATLAB® can be extended by means of "toolboxes." Each toolbox is a program and contains a collection of functions that pertain to specific application areas. MATLAB® also includes a facility for object oriented programming. This facility allows a developer or user to extend the MATLAB® language by creating new classes of objects, or data types, which can be manipulated using defined methods, or rules. These new objects adhere to established and accepted principles of object oriented programming, including encapsulation, polymorphism, overloading, inheritance, and aggregation as known by those skilled in the art. Because MATLAB® objects adhere to these principles, a developer or user can more rapidly build new applications that are feature-rich, reliable, and easy to use effectively.

While MATLAB® traditionally runs on the CPU, attempts have been made to execute MATLAB® instructions on the GPU. Currently a MATLAB® user wanting to access the computational power of the GPU must be intimately familiar with several programming languages including C or C++, CUDA, C for Graphics, GLSL, HLSL, Open GL, and DirectX.

In one example, a programmer, wanting to execute computations on a GPU through MATLAB®, must create a C or C++ script which can call the GPU by way of CUDA. CUDA, short for Compute, Unified Device Architecture, was created by NVIDIA and interfaces to NVIDIA brand GPUs. CUDA allows programmers to use to code algorithms for execution on NVIDIA GPUs by way of the C or C++ programming languages. A programmer would first create a C or C++ code that can properly perform computations on the GPU through CUDA. Next, the programmer must create a MATLAB® function that calls the C or C++ program that interfaces with CUDA. Therefore under this approach, a programmer must have a significant working knowledge of MATLAB, C or C++, and CUDA.

Alternatively, a programmer unfamiliar with CUDA can create a C or C++ code which interfaces with OpenGL and CG. Open GL, short for Open Graphics Library, is a lower level API, which stands for application-programmer interface which is used for creating applications that produce both two dimensional and three dimensional computer graphics. CG, short for C for Graphics, is a high level shading language developed by NVIDIA. CG is based roughly on the C programming language which allows a programmer to create complex graphics without having to learn a GPU assembly language. Under this approach, a programmer wishing to execute MATLAB® commands on the GPU must write a C or C++ program to interface with CG. Then the programmer must create a CG program to communicate with a GPU as well as an Open GL program to further communicate with the GPU. These programs are in addition to the MATLAB® code which must call the C or C++ application. In this case, a programmer would have to have knowledge of MATLAB®, C or C++, CG, and Open GL. A programmer has the option of creating code on GLSL instead of CG. GLSL, short for OpenGL shading language, is a high level shading language based on C and was created by OpenGL developers to give programmers more control of the graphics without having to learn an assembly language. In this case, a programmer would have to have knowledge of MATLAB®, C or C++, GLSL, and Open GL.

A third option involves creating code for HLSL and DirectX. DirectX is a collection of lower level application programming interfaces related to graphics programming. HLSL, short for Higher Level Shader Language, is a shading language, developed by Microsoft, and is used for creating code in DirectX. A programmer wishing to execute MATLAB® instructions on a GPU must create a MATLAB® function which calls a C or C++ command which in turn calls on HLSL and then DirectX. Consequently, a programmer must have knowledge of MATLAB®, C or C++, HLSL, and DirectX.

These three alternatives present two distinct, yet related problems. First, a user wishing to execute MATLAB® instructions on a GPU must understand and create applications in several programming languages. Second, by relying on these other programming languages, the primary benefit of using MATLAB® is negated. MATLAB® owes some of its popularity to the fact that it is an interpreted, rather than compiled language. Interpreted languages are inherently easier to program in because a programmer can test the program after each command whereas compiled language require the program to be complete before executing.

Therefore, there is a need for a system that facilitates execution of CPU-based instructions on a GPU.

SUMMARY OF THE INVENTION

The disadvantages of the prior art are overcome by the present invention which, in one aspect, is a method, executable on a digital computer that includes a central processing unit (CPU) and a graphics processing unit (GPU), for executing a series of instructions, in which a GPU data type is defined and at least one data unit is designated with the GPU data type. A series of instructions is executed on the central processing unit. The method determines that a first unit of instruction code, included in the series of instructions, will be scheduled to operate on a GPU data type-designated data unit within a predetermined number of cycles. The GPU data type-designated data unit is caused to be operated on by a second unit of instruction code, that functionally corresponds to the first unit of instruction code. The second unit of instruction code is executed on the graphics processing unit.

In another aspect, the invention is a digital computer that includes a central processing unit (CPU) having a CPU memory and a graphics processing unit (GPU) having a GPU memory. An application includes a first plurality of functions that are configured to execute on the CPU. A second plurality of functions is stored on the GPU memory, each of the second plurality of functions is functionally equivalent to a corresponding one of the first plurality of functions and each configured to execute on the GPU. At least one first data unit is assigned to a GPU data type. A runtime is configured to execute the first plurality of functions on the CPU until one of the first plurality of functions is called to operate on the first data unit assigned to the GPU data type, the runtime also configured to cause at least one of the second plurality of functions to execute on the GPU and operate on the first data unit when one of the first plurality of functions is called to operate on the first data unit.

In yet another aspect, the invention is a computer executable runtime that is stored on a digital memory device. The runtime is configured to cause a computer, that includes a central processing unit (CPU) in communication with a graphics processing unit (GPU), to execute a plurality of instructions. The runtime executes a first plurality of functions on the CPU until one of the first plurality of functions is called to operate on a first data unit assigned to a GPU data type. The runtime causes at least one of a second plurality of functions to execute on the GPU and operate on the first data unit when one of the first plurality of functions is called to operate on the first data unit. Each of the second plurality of functions functionally corresponds to a function of the first plurality of functions.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

One embodiment includes a technique for recording a series of commands from a first CPU program at run time and executing those commands on another piece of computing hardware. In particular, this technique is geared towards maintaining compatibility with MATLAB®, but those skilled in the art will realize that the technique is particularly compatible with any interpreted programming environment with pass by value semantics. The set of features supported by the following technique may be a superset of those features required for non-interpreted programming environments such as C or C++.

In one embodiment, a software program can automatically convert instructions from a first CPU-based program, to instructions that are executed on a GPU. The system includes a series of operational overloads which replace or subsidize select operations of the CPU-based program with custom operations that are executed on a GPU. These operational overloads execute instructions on a GPU by replicating the commands a user would otherwise have to create in CUDA, Open GL, or DirectX or other equivalent. After executing the desired calculations on the GPU, the program returns the results to the CPU-based program in such a way to coincide with results which would normally be executed on a CPU.

By automatically converting the CPU-based program instructions, to instructions which are executed on a GPU, the inventive system eliminates the need to learn multiple program languages and eliminates the need to create several programs to perform a CPU-based program calculation on a GPU. Furthermore, executing commands employing this method creates certain performance enhancements due to inefficiencies introduced by previous methods of executing traditional CPU commands on a GPU.

One method for processing data in a MATLAB® environment on a GPU includes the steps of: (a) replacing or subsidizing select MATLAB® functions; (b) entering a command into MATLAB® which is covered by the replaced or subsidized MATLAB® functions; (c) utilizing a runtime program to convert the MATLAB® instructions to instructions for a GPU; (d) executing the instructions on a GPU; and (e) returning the result of those instructions to MATLAB®.

A method of tracking operations to MATLAB® variables includes the steps of: (a) storing an independent variable in a memory stack and associating that memory stack to the MATLAB® variable; (b) storing the operands to an independent variable in a separate data stack and associating the separate data stack to a dependent MATLAB® variable; (c) linking the separate data stack to the original data stack; (d) creating a MATLAB® object for both the independent and dependent variables which point to their respective data stacks; (e) returning the data stacks to MATLAB®.

A method of improving efficiency of computations includes the steps of: (a) analyzing linked data stacks; (b) pass a first data stack to a GPU; (c) traversing the data stack on a GPU (d) allocating memory and storing the result of the computation (e) replacing the contents of the data stack with a reference to the memory; and (f) returning a MATLAB® object, linked to the data stack to MATLAB®.

A method of improving efficiency of computations includes the steps of: (a) analyzing linked data stacks; (b) pass a first data stack to a GPU; (c) traversing the data stack on a GPU (d) allocating memory and storing the result of the computation (e) replacing the contents of the data stack with a reference to the memory; (f) analyzing subsequent linked data stacks and repeating steps (b)-(e) as applied to the subsequent linked data stacks; and (g) returning a MATLAB® object, linked to the data stack to MATLAB®.

A method of improving computation efficiency by only executing instructions which require a result includes the steps of: (a) associating a handle to each data stack in the operating environment; (b) associating a flag with each handle; (c) setting the flag when at least one variable from the CPU-based program is referencing the data stack and unsetting the flag when no variables from the CPU-based program are referencing the data stack; and (e) computing only those data stacks which are associated with a set flag.

A method of returning data from a runtime program to MATLAB® includes: (a) creating a stack directive, where the stack directive contains an access pattern (b) pushing the stack directive onto a stack containing a buffer reference, (c) accessing the memory referenced by the buffer reference in accordance with the access pattern described in the stack directive and (d) returning the appropriate value to MATLAB®.

One representative embodiment of the invention is directed to a system that overloads the operations of a central processing unit (CPU) based program with an instruction to execute the same command on a graphics processing unit (GPU). As used herein, a CPU-based program is any type of computer software or instruction which executes commands on a CPU, as opposed to any other type of process, such as a GPU. For example, if an algorithm is originally written in MATLAB® code, the system can covert the MATLAB® instructions, originally written for a CPU, to a format which can be executed on a GPU. The instructions to the GPU are automatically created by the system, thereby eliminating the need for a programmer to learn the necessary translations. Further, by executing the commands on the GPU, the code may run faster and more efficiently.

The embodiments disclosed herein can be performed in any of a variety of known computing environments. These environments typically include a CPU, a GPU, memory, and a user interface, such as a monitor which employs a keyboard and a mouse to receive user input. For example, a stand-alone workstation or in a client/server environment may be employed.

Figure 1:
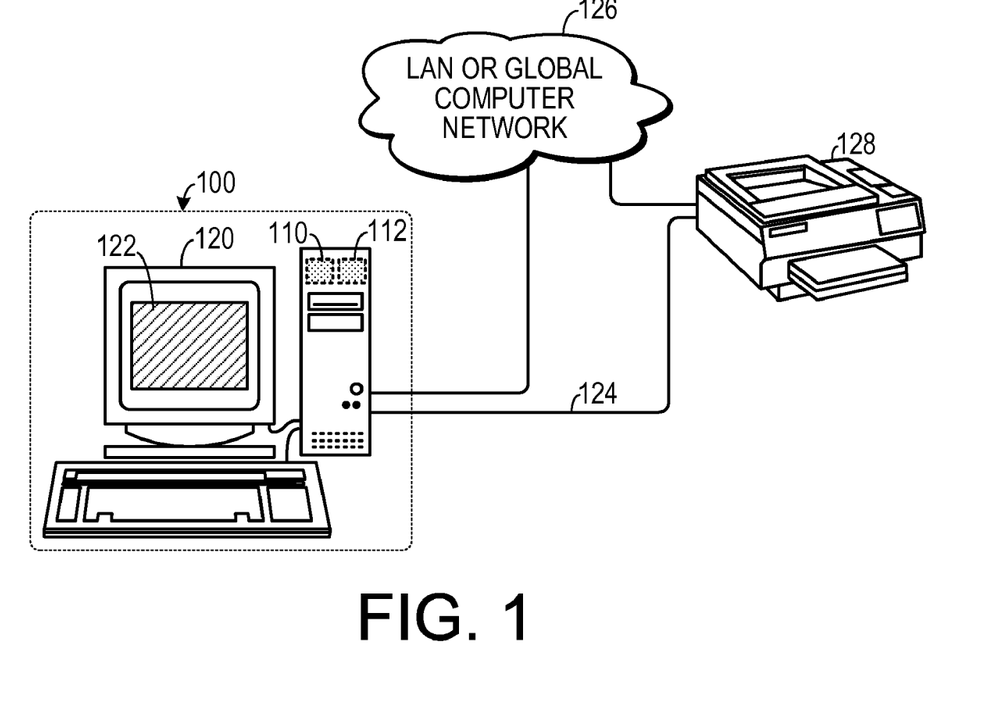
FIG. 1 is a schematic diagram of a computer system according to one representative embodiment.

As shown in FIG. 1, a host computer 120 includes a CPU 110 and a GPU 112. The host computer 120 is coupled to a display 120, such as a monitor, upon which a graphics user interface 122 may display data. At least one peripheral device 128 (such as a printer) may be in communication with the host computer 120. Coupling of the peripheral device 128 may be effected by either a direct connection 124 or through a network 126 (such as a global computer network or a local area network). A computationally intensive environment (such as MATLAB®) can be hosted in host computer 100. A user can communicate with the computationally intensive environment through the graphical user interface 122, in which the computationally intensive environment can be displayed.

In operation, upon receiving an input from the graphical user interface 122, the host computer 100 translates the input into a computer command to cause either the CPU 110 or GPU 112 to execute a predetermined action responsive to the computer command. The predetermined action can be a step or steps of processing data, programs of the computationally intensive environment, and programs as part of the operating system (O/S) of the host computer 100. All or part of the programs can be resident in a memory of the host computer 100, in a separate memory, in a CD, in a diskette, or in a memory device coupled to the host computer 100 through a network 126 that can be accessed and downloaded. The translation may be done in one of several ways. For example, the CPU 110 could employ a look-up table resident in memory to generate a computer command. Similarly, the computer commands could be hard wired in the host CPU 110 or they could be resident in firmware. The computer commands are data or instructions in digital form, which are readable to the CPU 110. Unless the context clearly dictates otherwise, as used in the description herein and throughout the claims that follow, the meaning of "data" includes any information in digital form that is received by, originated at, saved in, related to, or exchanged by host computer 100.

According to one embodiment, a runtime system operates in conjunction with a CPU-based program and translates instructions that would otherwise be executed on the CPU 110 into instructions that are directed toward execution on the GPU 112. In one embodiment, the runtime system is implemented as a computer program written in the C programming language (however, it will readily be appreciated that the runtime system could be written in a variety of other programming languages including, but not limited to, C++, Basic, and Fortran, etc.). In the runtime system, a software program maintains a persistent state that is independent of the CPU-based program. The state can be independent either in terms of memory or hardware. Generally, the runtime system accepts requests from the CPU-based program, queues those requests and then fulfills those requests in some optimal way. In one embodiment, the runtime system queues a series of requests until a result is required by first CPU-based program. Only when a result is required will the runtime system execute the commands. In addition to queuing commands, the runtime system transforms commands from MATLAB® to commands which are more efficient to be performed on GPU 30.

Figure 2:
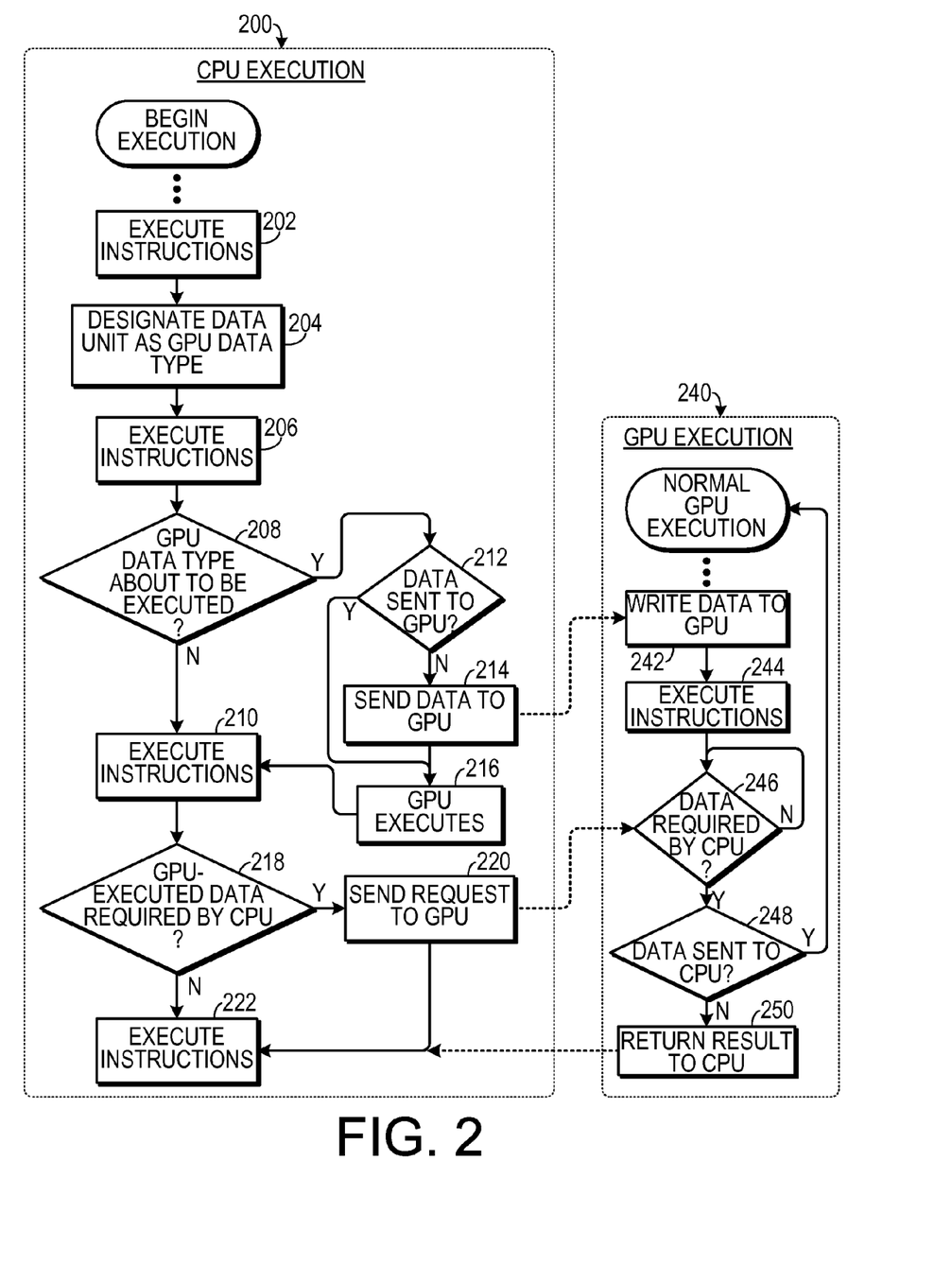
FIG. 2 is a flow chart demonstrating a high level embodiment.

As shown in FIG. 2, one embodiment of a computer-implemented runtime (a system that can be an application that is configured at least to schedule functions on both the CPU and the GPU) allows for both a CPU-based execution 200 of instructions and a GPU-based execution 240 of instructions. Typically, a program (such as a computationally intensive program) would begin execution by executing a plurality of instructions 202. The programmer would have the option to designate 204 one or more units of data (such as a data matrix or an array) as having a GPU execution data type. This assignment may occur as a result of execution of program code that sets a GPU execution data type flag in a header of a data unit. When a CPU-based function (or other type of series of instructions) attempts to operate on a GPU execution data type data unit, the runtime system will cause the function to be executed on the GPU.

While it is possible that the system could send a thread of execution to the GPU immediately after the designation step 204, such a transfer could happen after many more instructions are executed 206 on the CPU. Once the system detects that a GPU execution type data unit is about to be executed 208, then the system will determine if the data unit is already resident on the GPU 212 and, if not, it will transfer the data unit to the GPU 214. The system will also determine if the system has a GPU function corresponding to the CPU function about to be executed and, if so, the function is executed on the GPU 216. Otherwise, it will be executed on the CPU.

When a function is to be executed on the GPU, the data unit will be written to GPU memory if the data unit is not already resident on the GPU memory and the function will be executed on the GPU 244. Once execution of the function is complete, the data will remain resident on the GPU until it is requested from the CPU.

CPU execution will continue 210 until the CPU determines that it requires data that has been executed on the GPU 218. At this stage, the CPU will send a request 220 to the GPU for the data.

When the GPU detects a request for the data 246, it determines if the data has already been sent to the CPU 248 and, if not, it transfers the data unit to the CPU 250. Once the CPU receives the data unit, it continues with normal execution 222.

One embodiment also includes a MATLAB® interface. The interface consists of a series of MATLAB® functions, known as supplemental functions, installed in MATLAB®. Supplemental functions can either replicate the capabilities or outright replace traditional MATLAB® functions, known as native MATLAB® functions. Generally, one of ordinary skill in the art will understand how to replicate or replace native MATLAB® functions.

When a user types in a command in MATLAB®, the MATLAB® software will search the command path, which contains all the MATLAB® functions. When MATLAB® locates the proper function, it calls that function. The supplemental functions work in a similar manner. The system updates the MATLAB® software to either insert supplemental functions which replicate or replace native MATLAB® functions. When the system is installed and user types in a command which is encompassed by the toolbox embodied by the system, the toolbox function will be called instead of the native MATLAB® function.

The native MATLAB® functions can be overloaded either explicitly or implicitly. Explicit overloads are functions which are added to the MATLAB® path and do not replace native MATLAB® functions. Explicit overloads can be thought of as distinct functions. Accordingly, an explicit function will have a different name which the user will call at the command line. For illustrative purposes, the native MATLAB® function 'zeros( )' could correspond with the explicit supplemental function 'gzeros( )'. The name of the explicit function could vary. Implicit functions are functions which overload and replace native MATLAB® functions. In this case, implicit functions take the place of native MATLAB® functions. For illustrative purposes, the supplemental function would take the name of the native MATLAB® function such that a user would type the same name into the command line and the supplemental function, not the native MATLAB® function would be called.

The supplemental functions are written to mirror most of the capability of native MATLAB® functions. This includes, but not limited to, mirroring the behavior, inputs, outputs, and the text of error messages. While supplemental functions are very similar to native MATLAB® functions, there are a few differences. First, the supplemental functions contain code which calls the runtime system. The supplemental functions then either manipulates or returns a state associated with the GPU. Second, the functions are designed to appear as if they are executing the user's commands immediately, but in reality the functions have the capability of delaying executing the commands to increase efficiency.

In one illustrative embodiment, the system utilizes a combination of explicit and implicit supplemental functions. Explicit functions are useful for allowing a user to have access to the computing power of the GPU when necessary, but use the CPU when desired. As an example, the following explicit supplemental functions can be implemented: Kernel; apply; geye; gimagesc; gimread; gzeros; isBuffer; and isKernel.

Further, the following native MATLAB® functions are implicitly overloaded by supplemental functions: abs; a cos; a cos h; a sin; a sin h; a tan; a tan 2; a tan h; ceil; cos; cos h; data; display; double; end; eq; exp; filter2; fix; floor; ge; gt; imagesc; isfinite; isinf, isnan; le; log; log 2; lt; minus; mrdivide; mtimes; not; plus; pow2; rdivide; real; reallog; realsqrt; round; sign; sin; sin h; size; sqrt; subsasgn; subsref, tan; tan h; times; uminus; uplus; clear; and whos.

Another feature of the system is the ability to run native MATLAB® functions on the GPU. Most native MATLAB® functions require a data structure for the function to operate. If the data structure is holding data which is on the GPU, then the system will execute the associated function on the GPU, despite the fact that the function is a native MATLAB® function. The system takes advantage of the nature of native MATLAB® functions. Most complex native MATLAB® functions are aggregations of more simple native MATLAB® functions. If the constitute functions are overloaded, then effectively the more complex function will be overloaded, and the computation will be executed on the GPU.

As an example, 'fft( )' is a native MATLAB® function which computes a fast fourier transform of the data structure passed to the function. If the data structure which the 'fft( )' function will operate upon is located on the GPU and the constituent functions underlying the more complex 'fft( )' function are overloaded, then the 'fft( )' function will operate upon the GPU despite the fact that the 'fft( )' function is not overloaded.

Essentially any MATLAB® function can be overloaded with a function that executes on the GPU, but practically only the most basic functions need to be overwritten to take full advantage of the computational power of the GPU.

In one embodiment, the code of the supplemental functions is a simple script which calls the runtime system. The runtime system contains the majority of the code to replicate the native MATLAB® function. This ensures that time intensive calculations are executed on the GPU as opposed to the CPU. This approach increases speed.

Figure 3:
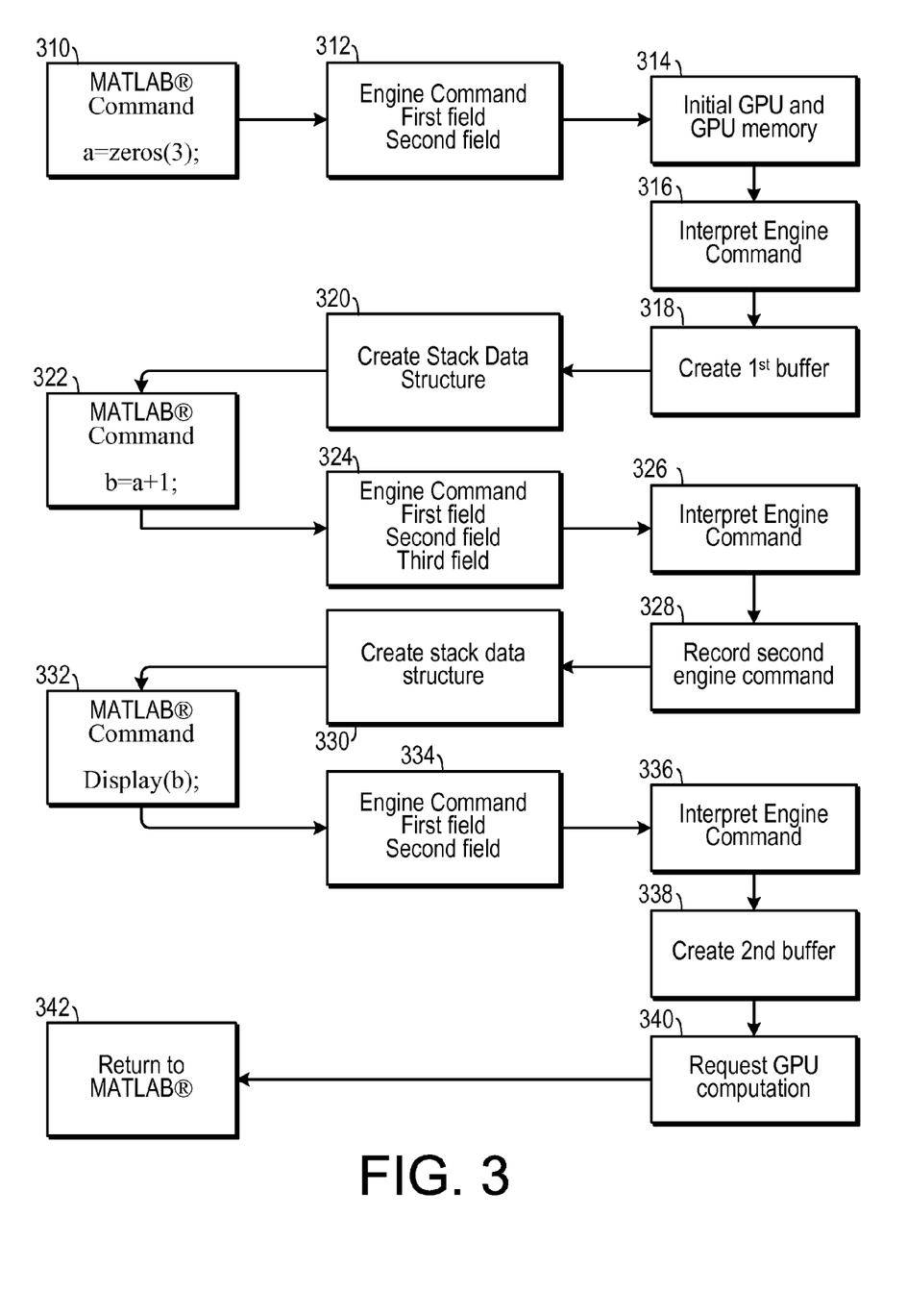
FIG. 3 is a flow chart demonstrating one example of an instruction set execution according to one representative embodiment.

In what follows, a technique of recording a series of commands from a first CPU program at run time for subsequent analysis and execution, possibly, on another piece of computing hardware is described. In particular, this technique is described in terms of MATLAB, but those skilled in the art will realize that the technique is applicable to many other languages such as C, C++, Java, Python, Ruby, etc As shown in FIG. 3, a sequence of events may be used to convert a command from a first CPU-based program, such as MATLAB®, and to generate a command to a GPU and to return that result to the CPU-based program.

Initially 310, a user enters in a command in MATLAB® at the command prompt 310. MATLAB® will then send an engine command to the runtime system 312. The engine command could be a call to the runtime system containing particular information. Such information could include at least two fields. The first field, an integer, represents an instruction to the engine and describes the command entered into MATLAB®. The second field relates to the information pertaining to the instruction in first field.

As an illustrative example, a user may enter the command "a=zeros(n)" in MATLAB®. MATLAB® contains a built in 'zeros' function which creates a matrix full of zeros. In this embodiment, the 'zeros' command has been overloaded or replaced by the MATLAB® interface. The effect of the overload or replacement results in any necessary computations being performed on the GPU 30 as opposed to the CPU, which is standard in MATLAB®.

Here, the user is defining the result of the 'zeros(n)' command to the variable 'a' 31. In this example, MATLAB® will generate an engine command to the runtime system in the form of "engine(x,(n,c))." In this example, the first field, represented by the character "x" is an instruction which directs the runtime system to execute a function which corresponds with the particular request type. The first field of the engine command is a particular request type associated with the 'zeros' function. The second field, represented by the character "n," is taken from the user command to MATLAB® and relates to the size of the zeroes matrix to be created. The second field also contains character 'c' which is a signal which instructs the runtime system how to populate the matrix.

Then, the runtime system will initialize the GPU, and initialize the GPU memory 314. The initialization of the GPU will only happen upon the first call to the runtime system. In subsequent calls to the runtime system, the runtime system will not re-initialize the GPU. Finally, the runtime system will initialize any data structures which may also be necessary.

The runtime system will then interpret engine command 316. Specifically the runtime system will analyze the particular instruction contained in first field to determine whether a buffer is required.

The runtime system will then create a buffer 318. The "buffer" collectively refers blocks of GPU memory and CPU memory along with any metadata associated with memory. The buffer serves as a base storage primitive for future operations on both the GPU and the CPU. The buffer is critical because traditional CPU memory is often incompatible with GPU memory. By creating the buffer, the system allows for GPU memory to be indexed and therefore compatible with CPU memory.

Next, the runtime system will create stack data structure 320. As shown in more detail in FIG. 4, this step includes: (a) creating stack data structure 410; (b) creating MATLAB® object 412; and (c) and returning MATLAB® object to MATLAB® 414.

Figure 4:
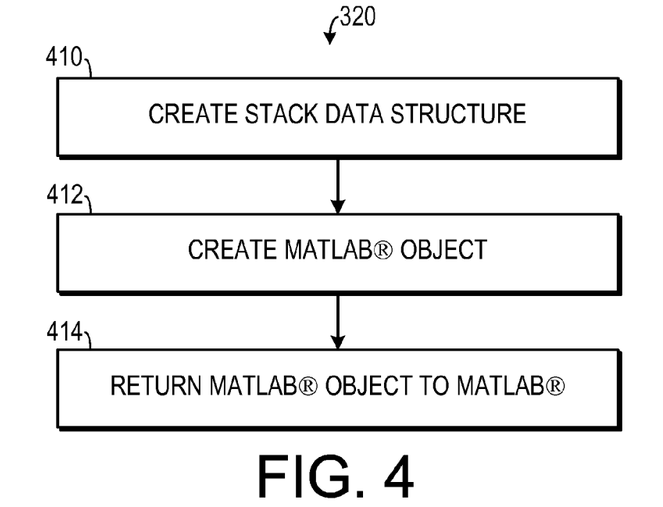
FIG. 4 is a flow chart depicting the creation of a stack data structure linked to a MATLAB® object.

In step 410, the runtime system creates stack data structure. Generally a stack is a temporary abstract data type and data structure, in the form of a simple array with multiple indexes. The stack data structure may also be one node of a direct acyclic graph. A directed acyclic graph is a direct graph with no directed cycles. In traditional CPU calculations, the register of CPU would read from the bottom of the stack to the top and would convert this information to assembly language. The stack data structure includes instructions and operands relating to the instructions. The operands can either be references to other stacks, buffers, or data contained on the CPU memory.

In step 412, the runtime system creates a MATLAB® object, which is data specifically made available to MATLAB® in a format recognized by MATLAB®. The MATLAB® object is associated with MATLAB® variable 'a' and points to the stack data structure with a stack reference. A buffer reference, describing the buffer, is pushed onto the stack data structure. As a result, the MATLAB® variable 'a' is pointing to the stack data structure with the stack reference. The stack reference points to stack data structure and the buffer reference. Therefore the MATLAB® object points to buffer reference. Consequently, anytime a user refers to MATLAB® variable 'a', the runtime system will be called and the MATLAB® object will be passed to the runtime system. The runtime system will then be able to locate the engine stack, the stack data structure and the buffer reference.

Figure 5:
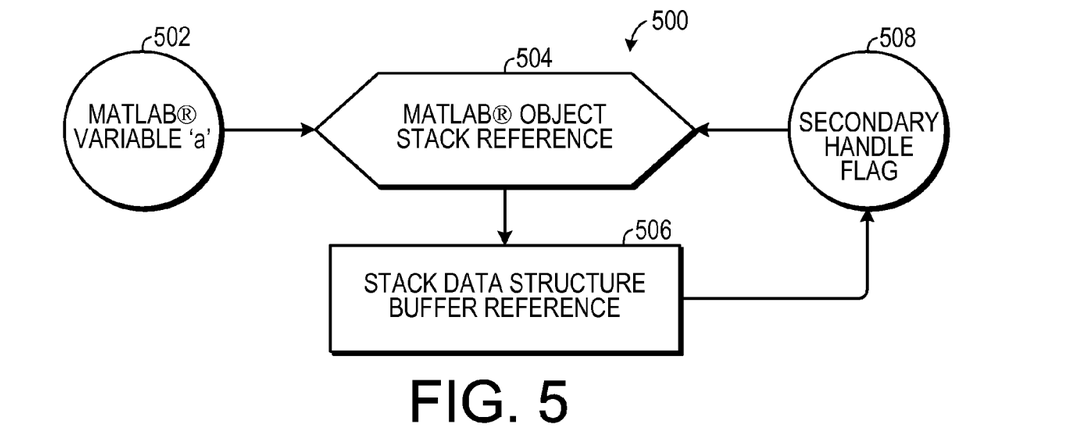
FIG. 5 is a schematic diagram of a data stack and MATLAB® object created according with one representative embodiment.

Attached to the stack data structure is a shared copy of MATLAB® variable 'a' known as a "secondary handle." The secondary handle is a handle to the MATLAB® object, just as MATLAB® variable 'a' is a handle that points to the MATLAB® object. The secondary handle is of the same data type as MATLAB® variable 'a'. The Secondary handle also contains a flag. The flag is a simple Boolean code. Where one or more MATLAB® variables are pointing to the MATLAB® object, MATLAB® will set the flag, indicating that at least two variables are pointing to the MATLAB® object. If only one MATLAB® variable is pointing to the MATLAB® object, MATLAB® will unset flag. An illustration of this arrangement is shown in FIG. 5. An original stack 500 will include MATLAB® variable 'a' 502, a MATLAB® object and an engine stack reference 504, stack data structure and a buffer reference 506, and a secondary handle and flag 508.

Returning to FIG. 4, in step 414, the runtime system will return to MATLAB® a MATLAB® object which contains a reference to the stack data structure.

Returning to FIG. 3, after the MATLAB® object is returned to MATLAB®, the user enters a second command in MATLAB® 322. MATLAB® will then send a second engine command 324 to the runtime system. Fore example, if the user enters the command "b=a+1" into MATLAB®, the second engine command, will include a first field first field, a second field and third field. The first field and the second field will be analogous to first field and second field of step 312. The third field is a request identification command which instructs the runtime system to record the operation.

The runtime system will then interpret 326 second engine command and record the operation 328 of second engine command. The operation is recorded in this instance because memory is not required.

Figure 6:
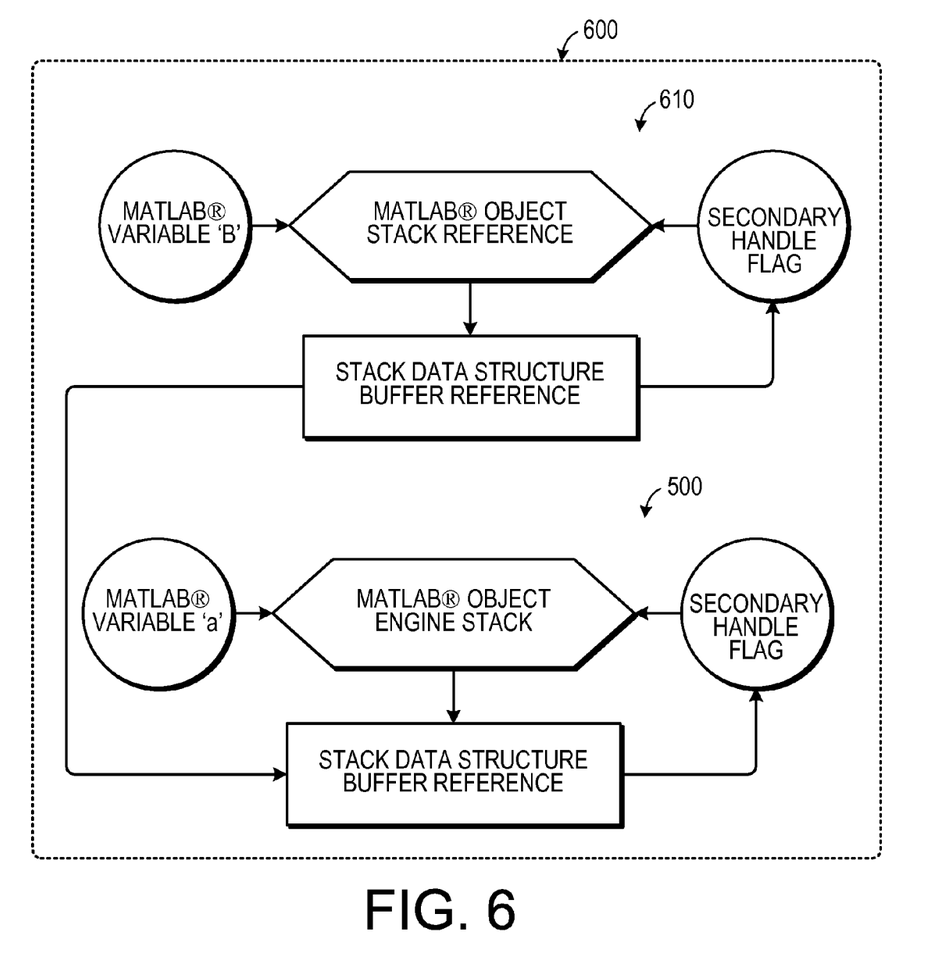
FIG. 6 is a schematic diagram of two data stacks linked together.

In step 330, the runtime system will create a second stack data structure. Next, the runtime system will create a second MATLAB® object and then the runtime system will return the second MATLAB® object to MATLAB®. As before, MATLAB® variable 'b' will point to the second MATLAB® object which is a MATLAB® dataset. The second MATLAB® object will contain a second engine stack which points to the second stack data structure. Because MATLAB® variable 'b' is defined in terms of MATLAB® variable 'a', the second stack data structure will contain a reference to the first stack data structure. Further, the second stack data structure contains a buffer reference which points to a secondary handle. Hereinafter, "the secondary stack" will refer to the combination of MATLAB® variable 'b', the second MATLAB® object, the second engine stack, the second stack data structure, the buffer reference, the secondary handle and a second flag. As shown in FIG. 6, the combination of the original stack 500 and the secondary stack 610 is referred to herein as a combination stack 600.

Returning to FIG. 3, the runtime system does not create a buffer because the runtime system simply records the operation of the engine command. The contents of the stack data structure simply record the operation of adding one to MATLAB® variable a. Therefore MATLAB® variable 'b' simply points to the second stack data structure which simply pushes a '+1' command to stack data structure. By creating multiple stacks and linking them together, the runtime system is capable of recording and maintaining multiple MATLAB® commands.

As shown in step 332, the user may enter command 'display(b)' in MATLAB®. As a result of this command, MATLAB® creates third engine command 334. The third engine command contains a first field and second field. The first field is an instruction for the runtime system to execute a display command. The second field is a parameter defining what needs to be displayed, which in this case is MATLAB® variable 'b'. In step 336, the runtime system will interpret third engine command 51, thereafter, the runtime system will create a second buffer 338. The second buffer is analogous to first buffer discussed in step 318.

Unlike the first two MATLAB® commands, the third engine command requires data to be returned to MATLAB®. Consequently, the runtime system will instruct the GPU to perform the calculation 340 and the result is returned to the application 342.

When a computation is required, the runtime system will attempt to execute the commands in the most efficient possible manner by executing the computation in the fewest steps as possible. In the current example, the stack data structures describe the computation required, however the description may not be in the most efficient order. The method below attempts to perform the computations in a more efficient manner.

Figure 7:
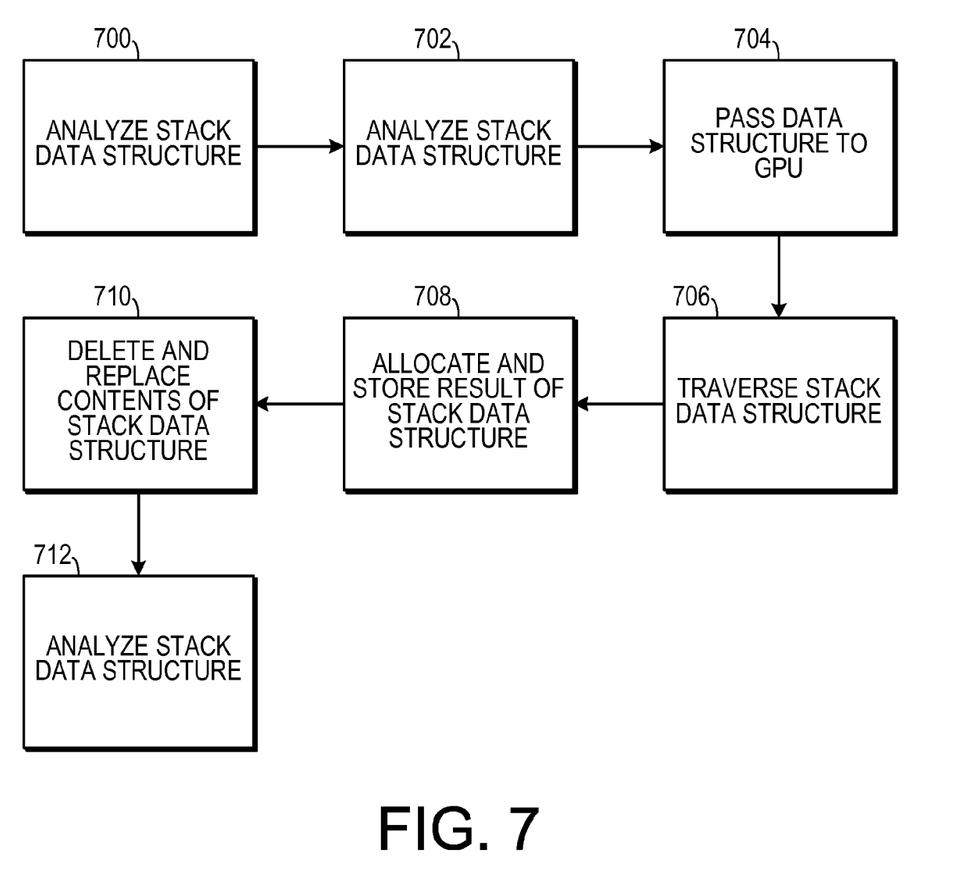
FIG. 7 is a flow chart showing one example of an implementation of a calculation function.

As shown in FIG. 7, because the user is asking for a display of MATLAB® variable 'b', the runtime system will first analyze stack data structure which is directly associated with MATLAB® variable 'b', step 700. However MATLAB® variable 'b' is dependent upon another variable, MATLAB® variable 'a'. Therefore, the runtime system will analyze all the stacks related to MATLAB® variable 'a' to determine whether MATLAB® variable 'a' is dependent upon any other MATLAB® variables 702. Because MATLAB® variable 'a' is independent of other MATLAB® variables—the stack data structure does not reference additional stack data structures and because the stack data structure does not require a computation the runtime system will begin computing stacks associated with MATLAB® variable 'b'.

Before making the computation, MATLAB® will analyze the flag associated with the primary handle and the MATLAB® object. As mentioned previously, the flag will indicate whether more than one variable is pointing to the MATLAB® object. In the current example, the MATLAB® variable 'b' is pointing to the MATLAB® object, therefore MATLAB® will set the flag. If no MATLAB® variable was pointing to the MATLAB® object, MATLAB® would unset the flag. The runtime system will only compute the stack data structure if the flag associated with it is set. In other words, the runtime system will only compute the stack data structure, if a MATLAB® variable is pointing to the stack data structure. Alternatively, the computation described by the stack data structure will be computed as a piece of any computations referencing stack.

Because a computation is required on the stack data structure and because the flag indicates that at least one variable is referring to the shared stack, the runtime system will pass the stack data structure to the GPU 704. The GPU thereby traverses the stack and performs the computation associated with stack data structure 706. After performing the calculation, the GPU allocates GPU memory and stores the result of the computation in GPU memory 708.

Once the computation of the stack data structure is complete, the runtime system deletes the contents of the stack data structure and replaces this data with a buffer reference 710. The buffer reference will point to the GPU memory which contains the solution to stack data structure. Consequently, after the GPU performs the necessary calculation on the stack data structure, only the buffer reference remains in the stack data structure. The buffer reference now points to the solution of the computation.

The functionality of the flags can be shown by considering the result of the following commands in MATLAB®:
 a=gzeros(3);
 b=a+1;
 a=fft(ones(3))
 display(b);
In this example, the runtime system will proceed in a similar manner as describe above. However, because the user initially defined MATLAB® variable 'a' to be the result of the 'gzeros(3)' command and then redefined MATLAB® variable 'a' to be the result of 'fft(ones(3)) a difference arises. Normally, the data associated with variable 'a' is stored in engine stack and in shared stack. However because MAT- LAB® variable 'a' has been redefined, the runtime system will break the link between MATLAB® variable 'a' and engine stack will be broken. The data originally associated with the computation of 'gzeros(3)' still exists, but no variable is pointing to that data. When this happens flag gets flagged to zero, indicating that no variable is pointing to this data. Because the runtime system will not compute a stack which is associated with a flag of zero, the command 'gzeros (3)' will not be sent to the GPU. In essence, the presence of shared flags eliminates calculations that are not necessary to the user. In the current example, the GPU will only compute the 'fft(ones(3))' and 'a+1' calculations but will not compute the 'gzeros(3)' command.

After the computation is complete, the runtime system will return the result to MATLAB® 712. In the simplest case, the MATLAB® variable would be pointing to a stack and the only contents of the stack is a buffer. In this case, the runtime system would simply copy the data which is referenced by the buffer to a MATLAB® array.

Complications arise when a first MATLAB® variable is defined in terms of a second MATLAB® variable. As an example, a user may define MATLAB® 'a' equal to the supplemental function 'ones(3)'. This will create a 3×3 matrix filed with ones. Thereafter, a user may define MATLAB® variable 'b' equal to a subset of the data contained in MATLAB® variable 'a' by the command 'b=a(1:2,:);'. MATLAB® uses a pass-by-value paradigm where the dependent variable 'b' behaves as a copy of a subset of the data associated with variable 'a'. Under this approach, if the user later changes variable 'b', variable 'a' will not be changed.

The runtime system accounts for the pass-by-value approach without creating an independent copy of the data which is represented by variable 'b'. The runtime system utilizes stack directives which are pushed onto the stack containing the buffer associated with variable 'b'. The stack directive contains an access pattern and a reference to the appropriate buffer. The access pattern instructs the runtime system what portion or permutation of variable 'a' needs to be accessed. The runtime system takes into account all the references on the stack directive and ultimately returns the appropriate data to MATLAB® in an array.

While this situation arises in MATLAB® scripts, a somewhat different result can be expected from non MATLAB® programs. In most other environments, the variable 'b' would be assigned to reference the subset of variable 'a' and when the user changed variable 'b', a portion of variable 'a' would also change. Therefore, the method described above would not be necessary.

As those skilled in the art will appreciate, while one embodiment of the present invention has been described in the context of a fully functional data management system, the mechanism of the present invention is capable of being distributed in the form of a computer readable medium of instructions in a variety of forms, and the present invention applies equally regardless of the particular type of signal bearing media used to actually carry out the distribution. Examples of computer readable media include: recordable type media such as floppy disks and CD-ROMs and transmission type media such as digital and analog communication links.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method, executable on a digital computer that includes a central processing unit (CPU) and a graphics processing unit (GPU), for executing a series of instructions, comprising the actions of:
   a. defining a GPU data type and designating at least one data unit with the GPU data type;
   b. executing a series of instructions on the central processing unit;
   c. determining that a first unit of instruction code, included in the series of instructions, will be scheduled to operate on a GPU data type-designated data unit within a predetermined number of cycles;
   d. when the GPU includes a second unit of instruction code that includes a function that corresponds to the first unit of instruction code, causing the GPU data type-designated data unit to be operated on by the GPU employing the second unit of instruction code and causing the GPU data type-designated data unit to be operated on by the CPU employing the first unit of instruction code when the GPU does not include a second unit of instruction code that includes a function that corresponds to the first unit of instruction code; and
   e. executing the second unit of instruction code on the graphics processing unit.

2. The method of claim 1, further comprising the actions of:
   a. determining if the GPU data type-designated data unit is resident on the GPU; and
   b. transferring the GPU data type-designated data unit to the GPU if the GPU data type-designated data unit is not resident on the GPU.

3. The method of claim 1, further comprising the actions of:
   a. after completing execution of the second unit of instruction code on the GPU thereby generating a result data unit, determining if the CPU has requested the result data unit; and
   b. transferring result data unit to the CPU after the CPU has requested the result data unit.

4. The method of claim 1, wherein the at least one data unit comprises a matrix.

5. The method of claim 1, wherein the series of instruction code is executed in an interpreter execution environment.

6. The method of claim 1, wherein the series of instructions is part of a computationally-intensive application.

7. A digital computer, comprising:
   a. a central processing unit (CPU) that includes a CPU memory;
   b. a graphics processing unit (GPU) that includes a GPU memory;
   c. an application that includes a first plurality of functions that are configured to execute on the CPU;
   d. a second plurality of functions, stored on the GPU memory, each of which is functionally equivalent to a corresponding one of the first plurality of functions and each of which is configured to execute on the GPU;
   e. at least one first data unit that is assigned to a GPU data type; and
   f. a runtime that is configured to execute the first plurality of functions on the CPU until one of the first plurality of functions is called to operate on the first data unit assigned to the GPU data type, the runtime also configured to cause at least one of the second plurality of functions to execute on the GPU when the GPU includes one of the second plurality of functions that is functionally equivalent to the one of the first plurality of functions that is called on to operate on the first data unit assigned to the GPU data type and operate on the first data unit, the runtime also configured to cause the one of the first plurality of functions to operate on the first data unit assigned to the GPU data type on the CPU when the GPU does not include one of the second plurality of functions that is functionally equivalent to the one of the first plurality of functions that is called on to operate on the first data unit assigned to the GPU data type.

8. The digital computer of claim 7, wherein the runtime is further configured to:
   a. detect if the first data unit is resident on the GPU memory; and
   b. write the first data unit to the GPU memory if the runtime determines that the first data unit is not resident on the GPU memory and if the runtime determines that the one of the first plurality of functions is called to operate on the first data unit assigned to the GPU data type.

9. The digital computer of claim 7, wherein the runtime is further configured to:
   a. store result data resulting from the operation of the one of the second plurality of functions on the first data unit in the GPU memory;
   b. wait for an indication that the CPU requires the result data; and
   c. transfer the result data from the GPU memory to the CPU memory after detecting the indication that the CPU requires the result data.

10. The digital computer of claim 7, wherein the at least one data unit comprises a matrix.

11. The digital computer of claim 7, wherein the first plurality of functions is executed in an interpreter execution environment.

12. A computer executable runtime, stored on a digital memory device, that is configured to cause a computer, that includes a central processing unit (CPU) in communication with a graphics processing unit (GPU), to execute a plurality of instructions comprising:
   a. execute a first plurality of functions on the CPU until one of the first plurality of functions is called to operate on a first data unit assigned to a GPU data type; and
   b. cause at least one of a second plurality of functions to execute on the GPU and operate on the first data unit when one of the first plurality of functions is called to operate on the first data unit, wherein each of the second plurality of functions functionally corresponds to a function of the first plurality of functions when the GPU includes one of the second plurality of functions that is functionally equivalent to the one of the first plurality of functions that is called on to operate on the first data unit assigned to the GPU data type and further configured to cause the one of the first plurality of functions to operate on the first data unit assigned to the GPU data type on the CPU when the GPU does not include one of the second plurality of functions that is functionally equivalent to the one of the first plurality of functions that is called on to operate on the first data unit assigned to the GPU data type.

13. The computer executable runtime of claim 12, further configured to execute instructions comprising:
   a. detect if the first data unit is resident on a GPU memory associated with the GPU; and
   b. write the first data unit to the GPU memory if the runtime determines that the first data unit is not resident on the GPU memory and if the runtime determines that the one of the first plurality of functions is called to operate on the first data unit assigned to the GPU data type.

14. The computer executable runtime of claim 12, further configured to execute instructions comprising:
   a. store result data resulting from the operation of the one of the second plurality of functions on the first data unit in the GPU memory;
   b. wait for an indication that the CPU requires the result data; and
   c. transfer the result data from the GPU memory to the CPU memory after detecting the indication that the CPU requires the result data.

15. The computer executable runtime of claim 12, wherein the at least one data unit comprises a matrix.

16. The computer executable runtime of claim 12, wherein the first plurality of functions is executed in an interpreter execution environment.

* * * * *